Figure 1:
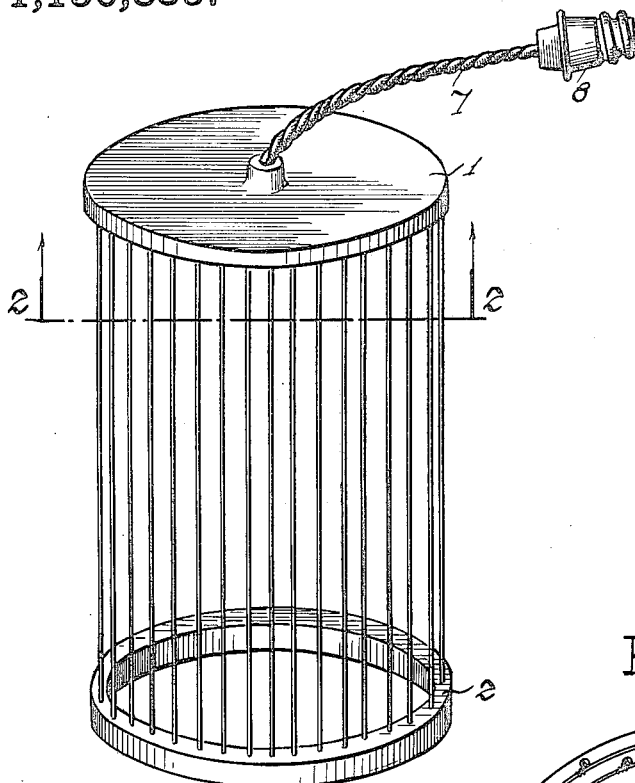

J. SATINOVER.
ELECTRIC TRAP.
APPLICATION FILED NOV. 27, 1914.

1,150,835.

Patented Aug. 17, 1915.

WITNESSES

Joseph Satinover
INVENTOR

UNITED STATES PATENT OFFICE.

JOSEPH SATINOVER, OF MONTREAL, QUEBEC, CANADA.

ELECTRIC TRAP.

1,150,835.  Specification of Letters Patent.  Patented Aug. 17, 1915.

Application filed November 27, 1914. Serial No. 874,301.

*To all whom it may concern:*

Be it known that I, JOSEPH SATINOVER, a subject of the King of Roumania, and residing at No. 556 St. Denis street, Montreal, Quebec, Canada, have invented certain new and useful Improvements in Electric Traps; and I do hereby declare that the following is a full, clear, and exact description of the invention, such as will enable others skilled in the art to which it appertains to make and use the same.

The invention to be hereinafter described relates to electric traps.

In order to more clearly disclose the construction, operation and use of the invention, reference should be had to the accompanying drawings forming part of the present application.

Throughout the several figures of the drawings like reference characters designate the same parts.

Figure 2:
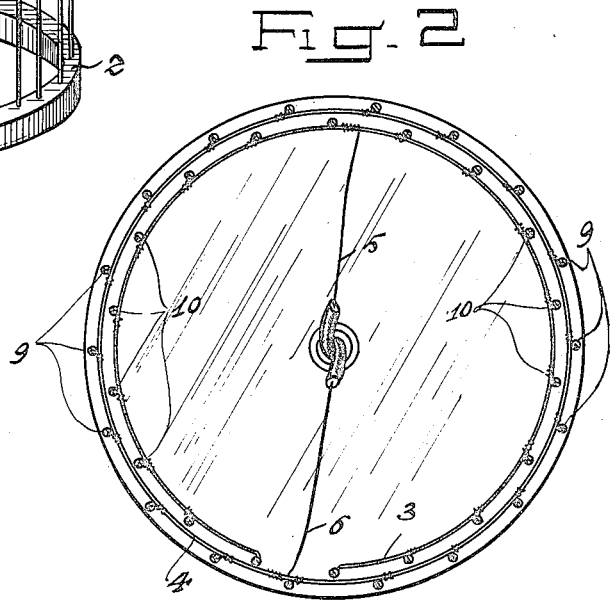

In the drawings: Figure 1 is a perspective view of the trap; and Fig. 2 is a section on line 2—2 of Fig. 1 looking up.

The main objects of the invention are, to provide a neat, compact, durable, and efficient means for killing flies and other insects by electrocution.

Referring to the drawings in detail, 1 designates a top disk of fiber or other suitable insulating material, and 2 a bottom ring of the same material as the disk. To the under face of disk 1 a wire 3, of any suitable material, is secured so as to form a nearly closed circle. Concentric with wire 3 a second wire 4 is secured in the form of a completely closed circle. The wire 3 is connected to one wire 5, and the wire 4 to the other wire 6, of a cord or cable 7 the other end of which is connected to a plug 8 adapted to be threaded into a light socket in the usual manner.

The disk 1 and ring 2 are secured together by a number of radially disposed equally spaced rods or wires arranged in two sets, an outer set and an inner set. The wires 9 of the outer set are electrically connected to wire 4 and the wires 10 of the inner set are electrically connected to wire 3. By this means, when plug 8 is threaded into its socket, the two sets of wires are connected to opposite sides of the electric circuit.

In use, the device may be suspended by cord 7 from any suitably situated socket. A fly, or other insect, alighting on any two of the rods 9 and 10 will electrically connect them and will receive the current through its body, thus being electrocuted. As shown in Fig. 2, the rods are so placed that every other one is of a different sign, *i. e.*, connected to opposite sides of the electric circuit.

By having the device constructed in the form of a hollow cylinder, open at its base, insects can be trapped from either inside the rods or outside of them, thus giving double the efficiency which could be available if the device was closed at the bottom.

It is thought that the construction, operation, and use of the invention will be clear from the preceding detailed description.

Changes may be made in the construction, arrangement, and disposition of the several parts of the invention without in any way departing from the field and scope of the same, and it is meant to include all such within this application wherein only a preferred form has been disclosed.

Having thus fully described my invention, what I claim as new and desire to secure by Letters Patent is:

1. An electrocuting trap for flies and other insects, containing two sets of metallic rods arranged in two concentric cylindrical surfaces, the rods of the inner set being arranged at the gaps between the rods of the outer set, and the two sets of rods being in electrical connection with the two different poles of a source of electric energy.

2. An electrocuting trap for flies and other insects, containing in combination, a disk of insulating material; a ring of insulating material of the same size as the disk and arranged parallel thereto; two sets of metallic rods arranged in two concentric cylindrical surfaces connecting the insulating ring to the insulating disk, the rods of the inner set being arranged at the gaps between the rods of the outer set; and means for connecting the two sets of rods electrically to two different poles of a source of electric energy.

3. An electrocuting trap for flies and other insects, containing in combination, a disk of insulating material; a wire-ring secured to the under face thereof; a second wire concentric therewith and spaced therefrom and bent to form a nearly closed circle; an electric cord formed of two wires one of which is connected to the first mentioned wire-ring and the other to the last mentioned wire, an electric plug secured on the end of the said cord, a ring of insulating material at some distance from and parallel to the disk of insulating material; a set of equally spaced parallel metallic rods extending in a cylindrical plane from the insulating disk to the insulating ring and electrically connected with the first-mentioned wire-ring; another set of equally spaced parallel metallic rods extending in a concentric inner cylindrical plane from the insulating disk to the insulating ring, and electrically connected with the aforementioned second wire, which forms the nearly closed circle, the rods of the second set being always on the gaps between the rods of the first set.

In witness whereof I have hereunto set my hand in the presence of two witnesses.

JOSEPH SATINOVER.

Witnesses:
J. GARDINI,
E. PIGGOW.